US009864425B2

United States Patent
Toksvig et al.

(10) Patent No.: US 9,864,425 B2
(45) Date of Patent: Jan. 9, 2018

(54) ADJUSTING MOBILE DEVICE STATE BASED ON USER INTENTIONS AND/OR IDENTITY

(71) Applicant: Facebook, Inc., Menlo Park, CA (US)

(72) Inventors: Michael John McKenzie Toksvig, Palo Alto, CA (US); Matthew Nicholas Papakipos, Portola Valley, CA (US); Cory Rudolph Ondrejka, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 169 days.

(21) Appl. No.: 14/954,157

(22) Filed: Nov. 30, 2015

(65) Prior Publication Data
US 2016/0091953 A1 Mar. 31, 2016

Related U.S. Application Data

(63) Continuation of application No. 13/100,151, filed on May 3, 2011, now Pat. No. 9,229,489.

(51) Int. Cl.
| | | |
|---|---|---|
| G06F 3/01 | (2006.01) | |
| G06F 3/048 | (2013.01) | |
| G06F 17/00 | (2006.01) | |
| G06F 1/32 | (2006.01) | |
| H04L 29/06 | (2006.01) | |
| G06F 21/32 | (2013.01) | |
| H04W 52/02 | (2009.01) | |

(Continued)

(52) U.S. Cl.
CPC ............ *G06F 1/3231* (2013.01); *G06F 1/169* (2013.01); *G06F 1/1626* (2013.01); (Continued)

(58) Field of Classification Search
CPC ...... G06F 1/1626; G06F 1/1686; G06F 1/169; G06F 1/1694; G06F 1/3231; G06F 3/0418; G06F 3/0481; G06F 21/31; G06F 21/32; G06F 21/44; G06F 21/604; G06F 2200/1637; G06F 2221/2111; G06F 2203/0339; H04L 9/3231; H04L 63/0861; H04L 63/10; H04L 63/126; H04L 63/166; (Continued)

(56) References Cited

U.S. PATENT DOCUMENTS 6,473,076 B1 * 10/2002 Thompson ............ G06F 1/1626
  178/19.01
7,552,467 B2   6/2009 Lindsay
(Continued)

FOREIGN PATENT DOCUMENTS

WO   2007/037760   4/2007
WO   2011/163350   12/2011

OTHER PUBLICATIONS

Hinckley et al., "Sensing Techniques for Mobile Interaction", Microsoft Research, UIST '00, San Diego, CA USA, 2000.
"Touch User Interface; Hand Touch—Hand Sensing Mobile Devices", http://www.touchuserinterface.com/2009/12/hand-touch-hand-sensing-mobile-devices.html, Dec. 2, 2009.
Synaptics, "Synaptics Debuts Fuse™ Next-Generation Mobile Phone Concept", http://www.synaptics.com/about/press/press-releases/synaptics-debuts-fust-next-generatio . . . , Dec. 14, 2009.
(Continued)

*Primary Examiner* — Michael J Eurice
(74) *Attorney, Agent, or Firm* — Baker Botts L.L.P.

(57) ABSTRACT

In one embodiment, while a mobile electronic device is in a first operation state, it receives sensor data from one or more sensors of the mobile electronic device. The mobile electronic device analyzes the sensor data to estimate a current intention of a user with respect to the mobile electronic device; and transition from the first operation state to a second operation state based on the current intention of the user with respect to the mobile electronic device.

42 Claims, 3 Drawing Sheets

(51) Int. Cl.

| | | |
|---|---|---|
| H04L 29/08 | (2006.01) | |
| G06F 21/44 | (2013.01) | |
| G06F 21/60 | (2013.01) | |
| H04L 9/32 | (2006.01) | |
| G06F 21/31 | (2013.01) | |
| G06F 3/0481 | (2013.01) | |
| G06F 3/041 | (2006.01) | |
| G06F 1/16 | (2006.01) | |

(52) U.S. Cl.
CPC ............ *G06F 1/1694* (2013.01); *G06F 21/32* (2013.01); *H04L 63/10* (2013.01); *H04L 63/166* (2013.01); *H04L 67/306* (2013.01); *H04W 52/0258* (2013.01); *H04W 52/0274* (2013.01); *G06F 1/1686* (2013.01); *G06F 3/0418* (2013.01); *G06F 3/0481* (2013.01); *G06F 21/31* (2013.01); *G06F 21/44* (2013.01); *G06F 21/604* (2013.01); *G06F 2200/1637* (2013.01); *G06F 2203/0339* (2013.01); *G06F 2221/2111* (2013.01); *H04L 9/3231* (2013.01); *H04L 63/0861* (2013.01); *H04L 63/126* (2013.01); *H04L 67/10* (2013.01); *H04L 67/125* (2013.01); *Y02B 60/1289* (2013.01); *Y02B 60/50* (2013.01)

(58) Field of Classification Search
CPC ..... H04L 67/10; H04L 67/306; H04L 67/125; H04W 52/0258; H04W 52/0274; Y02B 60/1289; Y02B 60/50
See application file for complete search history.

(56) References Cited

U.S. PATENT DOCUMENTS

| | | | | |
|---|---|---|---|---|
| 8,149,089 | B2 | 4/2012 | Lin et al. | |
| 8,174,503 | B2 | 5/2012 | Chin | |
| 8,494,961 | B1* | 7/2013 | Lucas | G06Q 20/1085 705/35 |
| 2001/0043232 | A1* | 11/2001 | Abbott | G06F 1/163 715/700 |
| 2001/0044908 | A1* | 11/2001 | Siu | G06F 1/1626 713/323 |
| 2001/0056544 | A1* | 12/2001 | Walker | B60R 25/02 726/2 |
| 2002/0103616 | A1* | 8/2002 | Park | G06F 1/3203 702/150 |
| 2002/0163509 | A1* | 11/2002 | Roberts | G06F 3/03545 345/173 |
| 2003/0028812 | A1* | 2/2003 | Stultz | G06F 21/575 726/2 |
| 2003/0074317 | A1* | 4/2003 | Hofi | G06Q 20/382 705/44 |
| 2003/0129964 | A1* | 7/2003 | Kohinata | G06K 9/00885 455/411 |
| 2003/0202541 | A1* | 10/2003 | Lim | H04B 1/70735 370/503 |
| 2004/0102931 | A1* | 5/2004 | Ellis | A61B 5/1038 702/188 |
| 2004/0108997 | A1* | 6/2004 | Lee | G06F 1/1626 345/179 |
| 2004/0194125 | A1* | 9/2004 | Miyazawa | H04N 7/1675 725/30 |
| 2004/0255179 | A1* | 12/2004 | Mayer | G06F 9/4406 714/1 |
| 2005/0100200 | A1* | 5/2005 | Abiko | G06K 9/00026 382/124 |
| 2005/0144468 | A1* | 6/2005 | Northcutt | G06F 21/10 713/189 |
| 2006/0038833 | A1* | 2/2006 | Mallinson | A63F 13/02 345/633 |
| 2006/0095369 | A1* | 5/2006 | Hofi | G06Q 20/10 705/39 |
| 2006/0120573 | A1* | 6/2006 | Iori | G06K 9/0002 382/124 |
| 2006/0165040 | A1* | 7/2006 | Rathod | G06Q 10/10 370/335 |
| 2006/0219776 | A1* | 10/2006 | Finn | B60R 25/25 235/380 |
| 2007/0037605 | A1* | 2/2007 | Logan | G08B 13/1427 455/567 |
| 2007/0082659 | A1* | 4/2007 | Nevalainen | H04M 1/72527 455/418 |
| 2007/0120948 | A1* | 5/2007 | Fujioka | H04M 1/66 348/14.01 |
| 2007/0128899 | A1* | 6/2007 | Mayer | G06F 9/4406 439/152 |
| 2007/0179987 | A1* | 8/2007 | Lim | G06F 21/6218 |
| 2007/0220279 | A1* | 9/2007 | Northcutt | H04L 25/03159 713/193 |
| 2007/0250920 | A1* | 10/2007 | Lindsay | G06F 21/31 726/7 |
| 2008/0006762 | A1* | 1/2008 | Fadell | G01J 1/4204 250/201.1 |
| 2008/0122796 | A1* | 5/2008 | Jobs | G06F 3/0488 345/173 |
| 2008/0165147 | A1* | 7/2008 | Christie | G06F 1/1626 345/173 |
| 2008/0225018 | A1* | 9/2008 | Pang | G06F 1/1626 345/179 |
| 2008/0259094 | A1* | 10/2008 | Kim | G06F 1/1626 345/651 |
| 2009/0005011 | A1* | 1/2009 | Christie | G06Q 10/107 455/412.2 |
| 2009/0152343 | A1* | 6/2009 | Carter | G06Q 10/0633 235/379 |
| 2009/0160609 | A1* | 6/2009 | Lin | G06F 21/32 340/5.83 |
| 2009/0177800 | A1* | 7/2009 | Gidron | H04L 67/1095 709/248 |
| 2009/0177981 | A1* | 7/2009 | Christie | G06F 3/04883 715/758 |
| 2009/0225026 | A1* | 9/2009 | Sheba | G06F 1/1626 345/156 |
| 2009/0284482 | A1* | 11/2009 | Chin | G06F 3/04883 345/173 |
| 2009/0285484 | A1 | 11/2009 | Mallinson et al. | |
| 2010/0004977 | A1* | 1/2010 | Marci | G06Q 10/10 705/7.32 |
| 2010/0048256 | A1* | 2/2010 | Huppi | H04M 1/72563 455/574 |
| 2010/0185945 | A1* | 7/2010 | Yang | H04M 1/72569 715/700 |
| 2010/0205628 | A1* | 8/2010 | Davis | H04M 1/72533 725/25 |
| 2010/0227691 | A1* | 9/2010 | Karsten | G07F 17/32 463/42 |
| 2011/0006880 | A1* | 1/2011 | Long | A61B 5/0015 340/5.83 |
| 2011/0047627 | A1* | 2/2011 | Sheymov | H04L 63/1425 726/26 |
| 2011/0102137 | A1* | 5/2011 | Schroter | G06K 9/0004 340/5.52 |
| 2011/0167341 | A1* | 7/2011 | Cranfill | G06F 3/0481 715/702 |
| 2011/0179372 | A1* | 7/2011 | Moore | G06F 3/0237 715/773 |
| 2011/0224509 | A1* | 9/2011 | Fish | A61B 5/0002 600/301 |
| 2011/0276396 | A1* | 11/2011 | Rathod | G06F 17/30867 705/14.49 |
| 2011/0306304 | A1* | 12/2011 | Forutanpour | G06F 3/04883 455/67.11 |
| 2012/0009896 | A1* | 1/2012 | Bandyopadhyay | G06F 1/1643 455/411 |
| 2012/0022382 | A1* | 1/2012 | Daisuke | A61B 5/002 600/481 |

(56) References Cited

U.S. PATENT DOCUMENTS

| | | | | |
|---|---|---|---|---|
| 2012/0054822 A1* | 3/2012 | Dvorak | ................ | G06F 1/1647 726/1 |
| 2012/0069131 A1* | 3/2012 | Abelow | ............... | G06Q 10/067 348/14.01 |
| 2012/0126940 A1* | 5/2012 | Coggill | .................. | G06F 21/36 340/5.54 |
| 2012/0242481 A1* | 9/2012 | Gernandt | ........... | G06K 19/0705 340/539.13 |

OTHER PUBLICATIONS

Ciara Byrne, *"Future Phones Will Have Touch Control on Screen, Back and Sides"*, VentureBeat, http://ventruebeat.com/2010/03/02/future-phones-will-have-touch-control-on-screen-back- . . . , Mar. 2, 2010.

Sarah Clark, *"RIM 'Pinch to Pay' Patent Offers More Control Over NFC Transactions"*, NFC World, hftp://www.nearfieldcom-municationsworld.com/2010/04/14/33391/rim-pinch-to-pay-paten . . . , Apr. 14, 2010.

Butler et al., *"SideSight: Multi-"Touch" Interaction Around Small Devices"*, Microsoft Research, Cambridge, UK, Downloaded Apr. 26, 2011.

Jack Purcher, *"Are Electrostatic Touch Sensors Coming to Future iOS Devices?"*, Pentently Apple, http:/www.patentlyapple.com/pantently-apple/2010/11/are-electrostatic-touch-sensors-comi . . . , Downloaded Apr. 26, 2011.

International Search Report and Written Opinion for International Application No. PCT/US2012/035322, Nov. 30, 2012.

\* cited by examiner

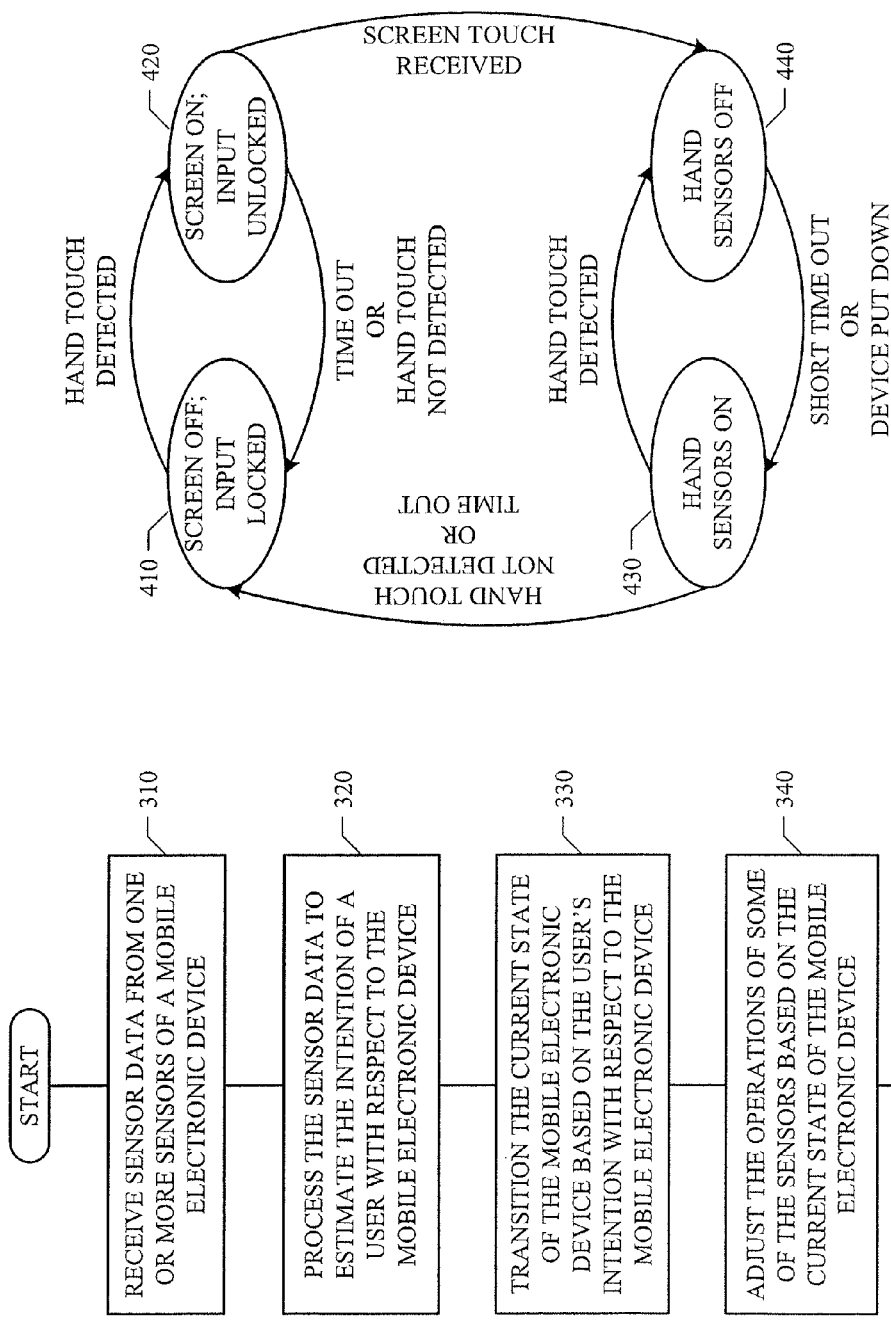

ADJUSTING MOBILE DEVICE STATE BASED ON USER INTENTIONS AND/OR IDENTITY

TECHNICAL FIELD

This disclosure generally relates to mobile electronic devices and more specifically relates to automatically adjusting the current operation state of a mobile electronic device based on a detected user intention.

BACKGROUND

A mobile electronic device, such as a smartphone, tablet, notebook computer, etc., may have multiple operation states. For example, while a mobile device is not being used by its user, it may be in a power-saving or sleep state (e.g., the screen is dim or dark) in order to decrease power-consumption level and prolong battery life. In some cases, the mobile device may also be in an input locked state (e.g., the touchscreen or keypad of the mobile device is locked) so that the mobile device does not perform unintentional or accidental operations. In other cases, the mobile device may be security locked, such that a user is required to provide a correct password or personal identification number (PIN) in order to unlock and use the device. On the other hand, while the mobile device is being actively used by its user, it may be in a normal operation state (e.g., at full power level and with the screen or keypad unlocked and ready to receive user input).

SUMMARY

This disclosure generally relates to mobile electronic devices and more specifically relates to automatically adjusting the current operation state of a mobile electronic device based on a detected user intention and/or the user's identity.

In particular embodiments, while a mobile electronic device is in a first operation state, it receives sensor data from one or more sensors of the mobile electronic device. The mobile electronic device analyzes the sensor data to estimate a current intention of a user with respect to the mobile electronic device; and transition from the first operation state to a second operation state based on the current intention of the user with respect to the mobile electronic device.

These and other features, aspects, and advantages of the disclosure are described in more detail below in the detailed description and in conjunction with the following figures.

BRIEF DESCRIPTION OF THE DRAWINGS

FIG. 3 illustrates an example method for automatically adjusting the current state of a mobile electronic device based on a detected user intention.

FIGS. 4A-4B illustrate two example state transition diagrams.

DESCRIPTION OF EXAMPLE EMBODIMENTS

Figures 1, 2:
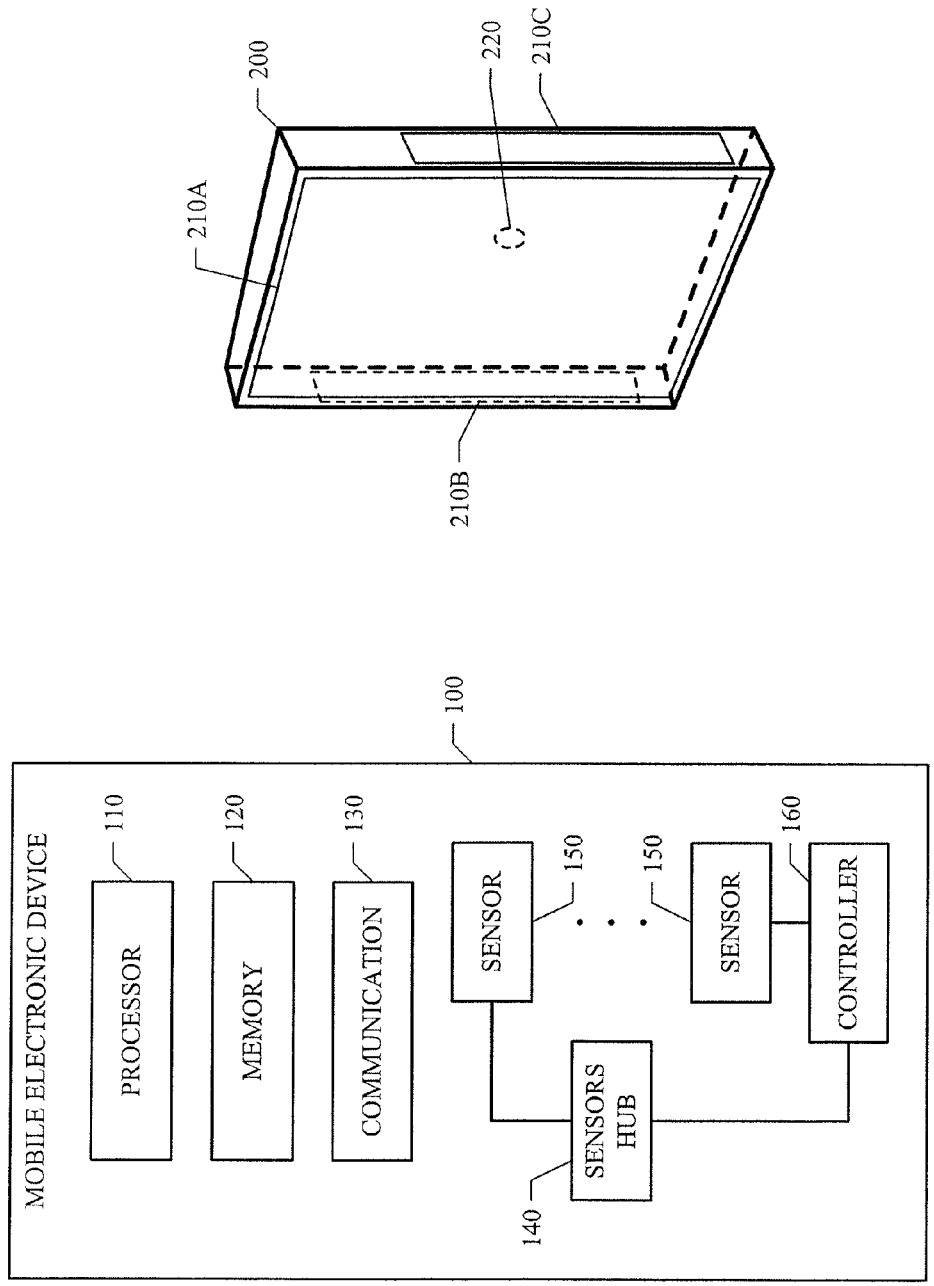
FIG. 1 illustrates an example mobile electronic device.
FIG. 2 illustrates the exterior of an example mobile device.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A mobile electronic device, such as a smartphone, tablet or notebook, may have multiple operation states. For example, when a mobile device has not being used by its user for a period of time (e.g., a few seconds), it may enter into a power-saving state. At the power-saving state, the mobile device may operate at a lower power level in order to save energy and prolong battery life. The screen of the mobile device may be dim or dark. To bring the mobile device out of the power-saving state into the normal power state, the user may need to perform an action with the mobile device (e.g., pushing the power button of the mobile device). In some cases (e.g., after the mobile device is in the power-saving state for a few seconds), the mobile device may also enter into an input-lock state. At the input-lock state, the input component (e.g., keypad or touch-sensitive screen) of the mobile device may be locked to prevent accidental inputs causing unintentional operations. To unlock the keypad or screen of the mobile device, the user may need to perform another action with the mobile device. For example, if the mobile device has a keypad, the user may need to push a key. If the mobile device has a touch-sensitive screen, the user may need to press a control to power up the device and make a swipe gesture on the screen. In addition, the mobile device may have a security-lock state. At the security-lock state, the mobile device is password or PIN (Personal Identification Number) locked to prevent unauthorized access to and usage of the mobile device. To unlock the mobile device, the user may need to enter the appropriate password or PIN. When the mobile device is being actively used by its user, it may be in a normal operation state (e.g., operating at the full power level and ready to receive user inputs). In some cases, the mobile device may be in an operation state where its audio output is turned on, an operation state where its audio output is turned off, or an operation state where its audio output is in a specific mode (e.g., loud, quiet, vibrate, etc.). Other operation states may also be possible, and this disclosure contemplates any applicable operation state.

At any given time, a mobile device may be in any one of the operation states, depending on, for example, whether the user is currently using the mobile device, the amount of time passed since the user's last use of the mobile device, the location of the mobile device (e.g., in a carrying case, in the user's pocket or purse, etc.).

For example, suppose that the user has not used his mobile device (e.g., an Apple iPhone) for some time and the mobile device has been stored in the user's pocket. In this case, the mobile device is most likely in the power-saving state to save battery as well as the input-lock state to prevent accidental inputs. In addition, the mobile device may also be in the security-lock state to prevent unauthorized access to the mobile device. Further suppose that the user now wishes to use his mobile device. The user may need to: (1) take the mobile device out of his pocket; (2) push the power button to bring the mobile device out of the power-saving state; and (3) swipe the touch screen to unlock the input component of the mobile device. In addition, if the mobile device is security locked as well, then the user also needs to enter the password or PIN to unlock the mobile device. At least, the user needs to perform a few actions, which may take several seconds, before the mobile device is ready to be used. Considering that such a sequence of actions may need to be performed several times a day (e.g., each time the user needs to use his mobile device after not using the mobile device for a period of time), it may become annoying.

Therefore, particular embodiments may automatically adjust the current state of a mobile electronic device based on the intention of a user with respect to the mobile electronic device. In particular embodiments, a mobile electronic device, such as a mobile device, may include various types of sensors, such as, for example and without limitation, touch sensors (disposed, for example, on a display of the device, the back of the device and/or one or more lateral edges of the device) for detecting a user touching the surface of the mobile electronic device (e.g., using one or more fingers), accelerometer for detecting whether the mobile electronic device is moving and the speed of the movement, thermometer for measuring the temperature change near the mobile electronic device, proximity sensor for detecting the proximity of the mobile electronic device to another object (e.g., a hand, desk, or other object), light sensor for measuring the ambient light around the mobile electronic device, imaging sensor (e.g., camera) for capturing digital images of objects near the mobile electronic device, location sensors (e.g., Global Positioning System (GPS)) for determining the location (e.g., in terms of latitude and longitude) of the mobile electronic device, near field communication (NFC) sensors, Bluetooth sensors, etc. This disclosure contemplates that a mobile electronic device may include any applicable type of sensors. These sensors may provide various types of sensor data, which may be analyzed to determine the user's intention with respect to the mobile electronic device at a given time.

FIG. 1 illustrates an example mobile electronic device 100. In particular embodiments, mobile electronic device 100 may include processor 110, memory 120, communication component 130 (e.g., antenna and communication interface for wireless communications), and a number of sensors 150 of various types (e.g., touch sensor, accelerometer, thermometer, proximity sensor, light sensor, imaging sensor, etc.). In particular embodiments, a sensors hub 140 may optionally be included in mobile device 100. Sensors 150 may be connected to sensors hub 140, which may be a low power-consuming processor that controls sensors 150, manages power for sensors 150, processes sensor inputs, aggregates sensor data, and performs certain sensor functions. In addition, in particular embodiments, some types of sensors 150 may be connected to a controller 160. In this case, sensors hub 140 may be connected to controller 160, which in turn is connected to sensor 150. Alternatively, in particular embodiments, there may be a sensor monitor in place of sensors hub 140 for managing sensors 150.

In particular embodiments, mobile electronic device 100 (e.g., a mobile device) may have a touchscreen as its input component. FIG. 2 illustrates the exterior of an example mobile device 200. Mobile device 200 has six sides: front, back, top, bottom, left, and right. Touch sensors may be placed anywhere on any of the six sides of mobile device 200. For example, in FIG. 2, a touchscreen incorporating touch sensors 210A is placed on the front of mobile device 200. The touchscreen may function as an input/output (IO) component for mobile device 200. In addition, touch sensors 210B and 210C are placed on the left and right sides of mobile device 200, respectively. Touch sensors 210B and 210C may detect a user's hand touching the sides of mobile device 200. In particular embodiments, touch sensors 210A, 210B, 210C may be implemented using resistive, capacitive, and/or inductive touch sensors. The electrodes of the touch sensors 210A, 210B, 210C may be arranged on a thin solid piece of material or a thin wire mesh. In the case of capacitive touch sensors, there may be two types of electrodes: transmitting and receiving. These electrodes may be connected to a controller (e.g., controller 160 illustrated in FIG. 1), which may be a microchip designed to drive the transmitting electrodes with electrical pulses and measure the changes in capacitance from the receiving electrodes caused by a user's touches in order to detect the locations of the user touches.

Of course, mobile device 200 is merely an example. In practice, a device may have any number of sides, and this disclosure contemplates devices with any number of sides. The touch sensors may be placed on any side of a device.

In particular embodiments, mobile device 200 may have a proximity sensor 220 (e.g., an infrared LED (light-emitting diode)) placed on its back side. Proximity sensor 220 may be able to supply sensor data for determining its proximity, and thus the proximity of mobile device 200, to another object.

FIG. 3 illustrates an example method for automatically adjusting the current state of a mobile electronic device (e.g., mobile electronic device 100 illustrated in FIG. 1 or mobile device 200 illustrated in FIG. 2) based on a detected user intention. In particular embodiments, a mobile electronic device may include any number of sensors of various types. These sensors may provide various types of sensor data. Upon receiving sensor data from one or more such sensors, as illustrated in STEP 310, the sensor data may be processed and analyzed to estimate or detect the current intention of a user with respect to the mobile electronic device, as illustrated in STEP 320. The current operation state of the mobile electronic device may be transitioned from one operation state to another operation state based on the estimated current intention of the user with respect to the mobile electronic device, as illustrated in STEP 330. In addition, optionally, the operations of some of the sensors may also be adjusted based on the current state of the mobile electronic device or the estimated current intention of the user with respect to the mobile electronic device, as illustrated in STEP 340. The steps illustrated in FIG. 3 are explained in more detail using the following examples.

For the first example, suppose that a user has a mobile device. However, the user has not used the mobile device for some time and the mobile device is stored in the user's pocket. Thus, the mobile device is currently in the power-saving state (e.g., with its screen dim or dark), and the input (e.g., touchscreen) of the mobile device is locked (i.e., in the input-lock state). Further suppose that the user desires to use the mobile device. Thus, the user may reach into his pocket, grab hold of the mobile device, and take it out of the pocket. In particular embodiments, while in the power-saving state, a processor of the device (such as a main CPU or a controller) may periodically wake up (for example, every 100 milliseconds) and poll one or more sensors to detect if a user has picked the device. Alternatively, in particular embodiments, the CPU may be waken up by other means without having to specifically poll the sensors. For example, the CPU may be waken up through an interrupt signal or event or by dumb circuit.

In particular embodiments, in addition to the front side, the mobile device may have touch sensors on the left and right sides. Optionally, the mobile device may also have touch sensors on the back, top, or bottom side (e.g., mobile device 200 illustrated in FIG. 2). Thus, as the user's hand touches the mobile device to grab hold of it, the touch sensors may detect the user's fingers or palm touching the mobile device. The touch-sensor data may be analyzed to determine when and where the user has touched the mobile device. When the user touches the mobile device, it may be an indication that the user may wish to use the mobile device. In particular embodiments, upon detecting that the user has touched the mobile device, the mobile device may be brought out of the power-saving state into normal operation state. The main CPU may be transitioned to a powered-up state, the screen of the mobile device may be turned on and lit up, and the input component (e.g., the keypad or touchscreen on the front side) of the mobile device may be unlocked automatically. As a result, by the time the user brings the mobile device out of his pocket and in front of his face, the mobile device is ready to receive user inputs and commence normal operations.

In particular embodiments, the placement of touch sensors on the left, right, top, and/or bottom sides may indicate whether a user is touching both sides of the mobile device (i.e., the user is grasping the mobile device). Thus, the touch sensors can differentiate grasping the mobile device in addition to simply touching it. In particular embodiments, being able to detect that the user has grasped the mobile device may yield a more accurate, and thus better, indication of the user's intention. Using this intention, the mobile device may be brought out of the power-saving state into normal operation state. The main CPU may be transitioned to a powered-up state; the screen of the mobile device may be turned on and lit up; and the input component (e.g., the keypad or touchscreen on the front side) of the mobile device may be unlocked automatically. As a result, by the time the user brings the mobile device out of his pocket and in front of his face, the mobile device is ready to receive user inputs and commence normal operations. Nevertheless, it is possible to estimate the user's intention using a single touch.

Sometimes, the user may put his hand in the pocket where the mobile device is stored and thus touch the mobile device even when the user does not really intend to use the mobile device at that time. When the user touches the mobile device, as detected by the touch sensors of the mobile device, the mobile device may transition from the power-saving state to the normal operation state (e.g., the screen is lit up and the main processors are woken up) and the input component may be unlocked. However, in case that such touch is accidental (i.e., the user does not really mean to take the mobile device out of his pocket and use it), in particular embodiments, there may be a time-out period, such that if, after some predefined time period, the user has not interacted with the mobile device (e.g., making inputs to the mobile device), the mobile device may transition back to the power-saving state (e.g., the screen the is darkened and the main processors enter into sleep mode) and the input component (e.g., the touchscreen) may be locked again.

Sometimes, the user may put his hand in the pocket where the mobile device is stored and thus touch the mobile device even when the user does not really intent to use the mobile device at that time. Such accidental touches usually last relatively short time periods. When the user intermittently and accidentally touches the mobile device, in particular embodiments, the device may interpret these intermittent touches as distinct from a continuous touch or grasp and not indicative of the user's intent to use the device, allowing the mobile device to remain in a power-saving state.

In particular embodiments, the mobile device may have an accelerometer in addition or instead of the touch sensors on the left and right sides. Again, sometimes, the user may put his hand in the pocket where the mobile device is stored and thus touch the mobile device even when the user does not intend to use the mobile device at that time. If the mobile device also has an accelerometer, the sensor data provided by the accelerometer may also be used to estimate whether the user intends to use the mobile device. When the mobile device is stored in the user's pocket, it may move as the user moves. However, such movements usually are relatively slow. On the other hand, when the user grabs hold of the mobile device and takes it out of the pocket to bring it in front of the user's face, there may be a relatively sudden increase in the movement speed of the mobile device. This change in the mobile device's movement speed may be detected based on the sensor data supplied by the accelerometer. In particular embodiments, upon detecting that there is a significant increase in the speed of the mobile device's movement, either by itself or in addition to detecting that the user has touched the mobile device, the mobile device may be brought out of the power-saving state into normal operation state (e.g., turn on the screen of the mobile device) and the input component of the mobile device may be unlocked automatically.

In particular embodiments, the mobile device may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of the mobile device. When the mobile device is stored in the user's pocket, it may stay mostly in one orientation. However, when the user grabs hold of the mobile device and takes it out of the pocket to bring it in front of the user's face, there may be a relatively sudden change in the orientation of the mobile device. The orientation of the mobile device may be detected and measured by the gyrometer. If the orientation of the mobile device has changed significantly, it may be another indication that the user may have taken the device out of his pocket.

In particular embodiments, the mobile device may have a light sensor. When the mobile device is stored in the user's pocket, it is relatively dark around the mobile device. On the other hand, when the user brings the mobile device out of his pocket, it may be relatively bright around the mobile device, especially during day time or in well-lit areas. The sensor data supplied by the light sensor may be analyzed to detect when a significant change in the ambient light level around the mobile device occurs. In particular embodiments, upon detecting that there is a significant increase in the ambient light level around the mobile device, either by itself or in addition to detecting that the user has touched the mobile device or in addition to detecting that there is a significant increase in the speed of the mobile device's movement, the mobile device may be brought out of the power-saving state into normal operation state and the input component of the mobile device may be unlocked automatically.

In particular embodiments, the mobile device may have a proximity sensor. The sensor data supplied by the proximity sensor may be analyzed to detect when the mobile device is in close proximity to a specific object, such as the user's hand. For example, as illustrated in FIG. 2, mobile device 200 may have an infrared LED 220 (i.e., proximity sensor) placed on its back side. When the user holds such a mobile device in his hand, the palm of the user's hand may cover infrared LED 220. As a result, infrared LED 220 may detect when the user's hand is in close proximity to mobile device 200. In particular embodiments, upon detecting that the mobile device is in close proximity to the user's hand, either by itself or in combination with other types of sensor indications, the mobile device may be brought out of the power-saving state into normal operation state and the input component of the mobile device may be unlocked automatically.

A mobile device may have any number of sensors of various types, and these sensors may supply different types of sensor data. Different combinations of the individual types of sensor data may be used together to detect and estimate a user's current intention with respect to the mobile device (e.g., whether the user really means to take the mobile device out of his pocket and use it). Sometimes, using multiple types of sensor data in combination may yield a more accurate, and thus better, estimation of the user's intention with respect to the mobile device at a given time than only using a single type of sensor data. Nevertheless, it is possible to estimate the user's intention using a single type of sensor data (e.g., touch-sensor data).

In particular embodiments, to avoid having sensors interfering with the normal operations (e.g., antenna signals) of a mobile device, when the mobile device is in the normal operation state, some of the sensors may be shut down. For example, suppose that the mobile device has transitioned from the power-saving state to the normal operation state upon detected that the user has touched the mobile device. The screen of the mobile device is turned on (i.e., lit up), the input component (e.g., the touchscreen) of the mobile device is unlocked, and the main processors of the mobile device are awakened. If the user begins using the mobile device (e.g., by making input on the touchscreen) or if additional sensor data indicate that the user has held the mobile device for a sufficient period of time, the touch sensors on the left and right sides of the mobile device may be shut down while the mobile device is in the normal operation state. On the other hand, these sensors may be turned on when the mobile device is in the power-saving state, so that they may provide sensor data for estimating user intentions with respect to the mobile device.

For the second example, again suppose that a user has a mobile device, and the user has not used the mobile device for some time. Thus, the mobile device is currently in the power-saving state (e.g., with its screen dim or dark). In addition, the mobile device is security-locked to prevent unauthorized access and usage. Further suppose that the user desires to use the mobile device. Thus, the user may grab hold of the mobile device (e.g., from his pocket or his bag where the mobile device has been stored) and bring it in front of his face.

Similar to the previous example, in particular embodiments, upon detecting that the user is grabbing hold of the mobile device based on one or more types of sensor data (e.g., touch, speed or light change, etc.), the mobile device may be brought out of the power-saving state into normal operation state. The screen of the mobile device may be powered up.

In particular embodiments, the identity of the user currently handling the mobile device may be verified. If the user currently handling the mobile device is the true owner of the mobile device, the mobile device may be unlocked automatically. On the other hand, if the identity of the user currently handling the mobile device cannot be verified satisfactorily, the user may be prompted and required to provide a password or PIN in order to unlock and use the mobile device.

There may be various means to verify a user's identity. In particular embodiments, the mobile device may have an imaging sensor (e.g., a camera). As the user brings the mobile device in front of his face, the camera may analyze captured digital images of the objects in front of its lens in order to capture the user's face. These images may be analyzed using one or more suitable facial recognition algorithms to locate and compare the user's face to the face of the owner of the mobile device (e.g., the face stored on file in connection with the mobile device). If there is a sufficient amount of similarity between the two faces (i.e., a match), then the user currently handling the mobile device may be verified as the actual owner of the mobile device, and the mobile device may be unlocked without asking the user to explicitly provide a password or PIN. The image representing the face of the owner of the mobile device may be stored on the mobile device itself or elsewhere (e.g., on a server accessible to the mobile device).

In particular embodiments, there may be a profile established for the true owner of the mobile device. The profile may include characteristic information about the owner of the mobile device, such as, for example and without limitation, the distance the owner typically holds the mobile device from his face, the typical distance between the owner's pocket and the position where the owner typically holds the mobile device in front of his face (e.g., based on the owner's height and arm length), the specific times of the day when the owner typically uses the mobile device (e.g., the owner typically checks his emails and other messages three times a day, around 10:00 am in the morning, 3:00 pm in the afternoon, and 8:00 pm in the evening), the specific locations (e.g., GPS) where the owner typically uses the mobile device (e.g., in his office or at home), whether there is an earpiece (e.g., a Bluetooth device) typically paired with the mobile device and if so, the identification of that Bluetooth device, and so on. The characteristic information of the user currently handling the mobile device, which may be determined by analyzing one or more types of sensor data (e.g., touch-sensor data to determine the placement positions of the user's fingers on the mobile device), may be compared to the characteristic information of the owner of the mobile device stored on file. If there is a sufficient amount of similarly between the two sets of characteristic information, then the user currently handling the mobile device may be verified as the actual owner of the mobile device, and the mobile device may be unlocked without asking the user to explicitly provide a password or PIN. For example, if, based on the profile information, the mobile device has a pairing Bluetooth earpiece and that particular Bluetooth earpiece is now present with the mobile device, it may be an indication that the user is the true owner of the mobile device, as the user possesses both the mobile device and the pairing Bluetooth earpiece. The characteristic information of the owner of the mobile device may be stored on the mobile device itself or elsewhere (e.g., on a server accessible to the mobile device).

In particular embodiments, a number of different means may be combined together to verify the identity of the user currently handling the mobile device. The results of one or more types of analysis may be combined to obtain a probability that indicates the likelihood that the user currently handling the mobile device is in fact the owner of the mobile device. In particular embodiments, there may be a predefined threshold (e.g., 80% probability). If the probability obtained from the analysis is at or above the threshold, the mobile device may be unlocked automatically (i.e., without asking the user to explicitly provide a password or PIN). Conversely, if the probability obtained from the analysis is below the threshold, the user may be asked to provide the correct password or PIN before the mobile device is unlocked. In particular embodiments, the owner of the mobile device may customize the threshold, and thus control the level of security he prefers to place on his mobile device. For example, if the owner wishes to have a higher level of security placed on his mobile device, he may increase the threshold (e.g., possibly all the way up to 100%). In this case, the owner may be asked to provide a password or PIN to unlock his mobile device more often. On the other hand, if the owner does not wish to be bothered with providing a password or PIN often but prefers that the mobile device is automatically ready for use on most occasions, he may decrease the threshold (e.g., possibly all the way down to 0%). In this case, the owner may be asked to provide a password or PIN to unlock his mobile device less often, but at the same time, there is a lower level of security placed on his mobile device.

In particular embodiments, if a mobile device is security locked, then it may not need to be unlocked unless the user desires to perform certain actions or operations with the mobile device. For example, when the mobile device is idle, there may be certain information displayed on the screen of the mobile device, such as the current date and time, the battery meter, the current ring-tone profile, etc. When the user picks up the mobile device, he may only wish to check the current time. In this case, it is sufficient that the screen of the mobile device is lit up, and it may not be necessary to unlock the mobile device unless the user wishes to perform further actions (e.g., making a phone call, checking emails, sending messages, reading news feeds, etc.) with the mobile device. Thus, in particular embodiments, upon detecting that the user is grabbing or picking up the mobile device, the screen of the mobile device may be automatically lit up so that the user may read what is displayed on the screen. However, the mobile device may not be unlocked immediately until the user performs a further action (e.g., tap the touchscreen or hit a key) with respect to the mobile device. For example, if the user wishes to make a phone call or send a message, the user may tap the touchscreen, at which time the mobile device may verify the user's identity (e.g., as described above) and automatically unlock the mobile device if the user's identify may be satisfactorily verified or prompt for a password or PIN if the user's identify cannot be verified successfully.

For the third example, suppose that a user has a mobile device and has been using his mobile device (e.g., making phone calls, sending messages, reading emails or news feeds, etc.). Thus, the mobile device is currently in the normal operation state (e.g., with the screen lit up and ready to receive user inputs). Further suppose that the user has finished using his mobile device for the time being. Thus, the user may put the mobile device down (e.g., on a table or in his pocket).

In particular embodiments, in addition to the front side, the mobile device may have touch sensors on the left, right, back, top, or bottom sides. As the user's hand releases (i.e., no longer touches) the mobile device, the touch sensors may detect that there is nothing touching the surface of the mobile device. This may be an indication that the user is not using the mobile device. In particular embodiments, when the touch-sensor data indicate that there is nothing touching the mobile device, the mobile device may transition into the power-saving state. The screen may be darkened and optionally, the main processors may enter into a sleep mode to save power. In addition, the input component of the mobile device may be locked (i.e., the mobile device is also put into the input-lock state) to prevent accidental inputs causing unintentional operations (e.g., accidentally dialing a phone number and making a phone call). In addition, the mobile device may be security locked (i.e., the mobile device is also put into the security-lock state) to prevent unauthorized access and usage of the mobile device.

In particular embodiments, if some of the sensors have been shut down during the time when the mobile device has been in the normal operation state (e.g., to reduce interference to the normal operations of the mobile device, as described above), these sensors may be turned on again so that they may now supply sensor data, which may be used to detect and estimate user intentions with respect to the mobile device (e.g., as described above).

Similar as above, the mobile device may include multiple sensors of different types, and these sensors may supply different types of sensor data (e.g., sensor data with respect to speed, light, temperature, proximity to object, etc.). In particular embodiments, a combination of different types of sensor data may be used to estimate the user's intentions (e.g., whether the user really has finished using his mobile device for the time being). For example, if the user has put the mobile device in his pocket or in a bag, the ambient light around the mobile device may decrease, which may be detected by the light sensor. This may be a further indication (e.g., in addition to the indication that the user is no longer holding the mobile device in his hand as indicated by the touch-sensor data) that the user has finished using his mobile device for the time being. Otherwise, if the user only temporarily puts down the mobile device and means to pick it up again soon, the user may not store the mobile device in his pocket or in a bag.

To briefly summarize the above examples, there may be multiple operation states (e.g., the power-saving sate, the input-lock state, the security-lock state, or the normal operation state) for a mobile electronic device. At any given time, the mobile electronic device may be in a particular operation state. Note that multiple conditions of the mobile electronic device may be combined into a single state. For example, during one state, the mobile electronic device may be both in the power-saving mode (e.g., the screen is darkened and the main processors are in the sleep mode) and the input component may be locked. In this case, the conditions of the power-saving sate and the input-lock state may be combined to form a single operation state. Similarly, during one state, the mobile electronic device may be both in the power-saving mode (e.g., the screen is darkened and the main processors are in the sleep mode) and security locked (i.e., password or PIN locked). In this case, the conditions of the power-saving sate and the security-lock state may be combined to form another operation state. In other words, there may be any number of operation states for a mobile electronic device, and each operation state may have any number of conditions of various types.

The mobile electronic device may have any number of sensors, which may supply different types of sensor data. One or more types of the sensor data may be collected and analyzed at a given time to estimate the user's current intention with respect to the mobile electronic device (e.g., whether the user desires to use the mobile electronic device). Based on the user's current intention with respect to the mobile electronic device, as estimated using the sensor data, the mobile electronic device may transition from its current state or states to another state or states.

FIG. 4A illustrates an example state transition diagram that includes some of the transition cases. The diagram illustrated in FIG. 4A represents the example where a mobile device includes some hand sensors (e.g., on the left and right sides of the mobile device) for detecting a user's hand touching the mobile device. The mobile device may also include some touch sensors (e.g., on the front of the mobile device, in the form of a touchscreen) for receiving inputs from the user. At state 410, the mobile device's screen is turned off (i.e., darkened) and its input component (e.g., the touch screen) is locked. When the mobile device is at state 410, upon detecting the user's hand touching the mobile device (e.g., the hand touch is detected by the hand sensors), the mobile device may transition from state 410 to state 420.

At state 420, the mobile device's screen is turned on (i.e., lit up) and its input component (e.g., the touchscreen) is unlocked and ready to receive user inputs. When the mobile device is at state 420, if the user does not interact with the mobile device (e.g., providing inputs to the mobile device) for a period of time (i.e., time out) or no hand touching of the mobile device is detected, the mobile device may transition back to state 410 (i.e., turn off screen, lock input component). On the other hand, if the user provides an input to the mobile device (e.g., by touching the touchscreen), the mobile device may transition to state 440.

At state 440, the hand sensors for detecting the user's hand touching the mobile device are turned off to save power and avoid interference to the normal operations of the mobile device. When the mobile device is at state 440, upon detecting that the user has put down the mobile device (e.g., in his pocket, a bag, or a carrying case, or on a table) or nothing has happened for a relatively short period of time (i.e., short time out), the mobile device may transition to state 430. For example, an accelerometer may be used to detect that the user has put down the mobile device.

At state 430, the hand sensors for detecting the user's hand touching are turned on so that they may detect whether the user's hand touches the mobile device. When the mobile device is at state 430, upon detecting the user's hand touching the mobile device, the mobile device may transition back to state 440. On the other hand, if the user's hand does not touch the mobile device (e.g., for a few seconds), the mobile device may transition to state 410 so that its screen may be shut down and its input component may be locked.

Figure 4B:
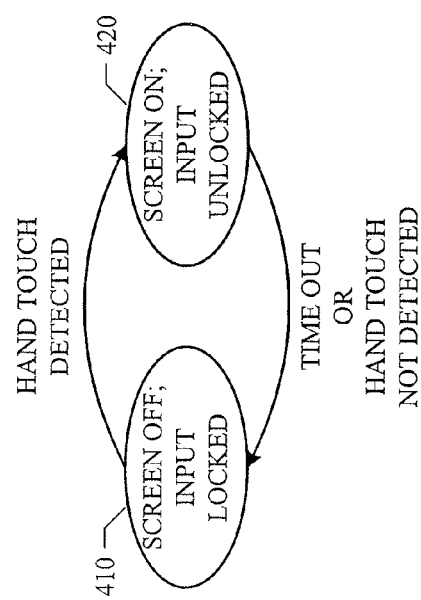

States 430 and 440 are optional. They are for saving power and avoiding having the hand sensors interfere with the normal operations of the mobile device. FIG. 4B illustrates another example state transition diagram that only includes states 410 and 420.

In particular embodiments, the sensors of a mobile device may be connected to a sensors hub (e.g., sensors hub 140 as illustrated in FIG. 1) or a sensor monitor. When the mobile device is in the power-saving state, the main processors (e.g., processor 110 as illustrated in FIG. 1) may enter into an idle or sleep mode to save power. However, the sensors hub or sensor monitor may be a low power-consuming processor that may remain operational while the mobile device is in the power-saving state. The sensors hub or sensor monitor may collect and analyze sensor data from various sensors, instead of the main processors, while the mobile device is in the power-saving state. When appropriate, the sensors hub or sensor monitor may wake up the main processors in order to bring the mobile device out of the power-saving state and into the normal operation state.

In particular embodiments, the user of the mobile device may be a member of a social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

The user may have a profile with the social-networking system that includes information relevant to the user (e.g., demographic data, social connections and activities, interests, hobbies, etc.). In particular embodiments, the information found in the user's profile may also be used to help determine the user's intention with respect to the mobile device at a given time or estimate the user's identity. For example, if based on the user's calendar stored with the social-networking system, it may be determined that the user is attending an event (e.g., a meeting), then the mobile device may be transitioned to a state where the screen is turned off and the input component is locked. As another example, it may be determined, based on the information available with the social-networking system, that the user is with his social connections (e.g., friends) at a given time and location. If the mobile device is in an atypical location for its owner, but at the same time, several of the owner's family members or friends are also there, this may suggest that the mobile device is with its true owner, in which case, the device may be unlocked without requiring a password or PIN. On the other hand, if the mobile device is in an atypical location and none of its owner's social connections is there, a password or PIN may be required to unlock the device to ensure that the user of the device is indeed its true owner.

In particular embodiments, the true owner of the mobile device may be able to specify settings and indicate conditions for unlocking the device without requiring a password or PIN. For example, the owner may specify that when a number of his social connections (e.g., friends or family members) are detected near the device (e.g., using any suitable means, such as NFC, voice or face recognition, etc.), the phone may be unlocked without requiring a password or PIN or have a lower threshold for security, and vice versa.

In particular embodiments, the user's status updates with the social-networking system may be used as a signal to help authenticate the user. For example, the user's status update may indicate that the user is actually in a specific location, may be used to detect that the user's friends are nearby, or the user is tagged by a friend in a check-in, which in turn indicates that the user is at a specific location.

In particular embodiments, the sensors included in the mobile device may be used to navigate within the social-networking system, including third-party applications (e.g., online games) provided through the social-networking system.

Figure 5:
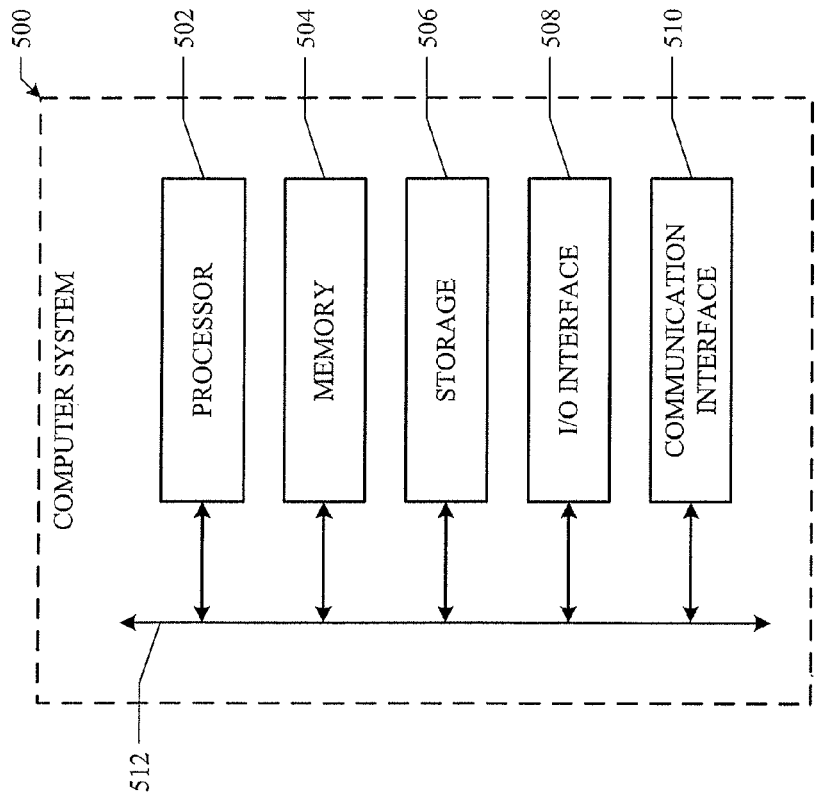
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500.

This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile device, a personal digital assistant (PDA), a server, a tool, a toy, an item of clothing, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a mobile device network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a mobile electronic device that is associated with a member of a social-networking system, receiving sensor data, while the mobile electronic device is in a first operation state, from one or more sensors of the mobile electronic device;
by the mobile electronic device, obtaining characteristic information maintained by the social-networking system and stored on the mobile electronic device, the social-networking system being remote from the mobile electronic device;
by the mobile electronic device, comparing the sensor data to the characteristic information maintained by the social-networking system to estimate a current intention of a user with respect to the mobile electronic device, the characteristic information being associated with the user as a member of the social-networking system; and
based on the comparison of the sensor data to the characteristic information maintained by the social-networking system, transitioning, by the mobile electronic device, from the first operation state to a second operation state based on the current intention of the user with respect to the mobile electronic device that was determined based on the sensor data and the information maintained by the social-networking system.

2. The method of claim 1, wherein:
while in the first operation state, a screen of the mobile electronic device is turned on, an input component of the mobile electronic device is unlocked, and the one or more sensors are all turned on; and
while in the second operation state, the screen of the mobile electronic device is turned on, the input component of the mobile electronic device is unlocked, and at least one of the one or more sensors is turned off.

3. The method of claim 1, wherein:
while in the first operation state, a screen of the mobile electronic device is turned off and the mobile electronic device is security locked, further comprising analyzing the sensor data and information maintained by the social-networking system to estimate the current intention of the user by comparing the sensor data to characteristic information stored in a profile associated with the user by the social-networking system; and
while in the second operation state, the screen of the mobile electronic device is turned on and the mobile electronic device is security unlocked without requiring user input of a password.

4. The method of claim 1, wherein the sensor data comprises imaging data, and the method further comprises:
determining, based on the imaging data and the information maintained by the social-networking system that the user is likely an owner of the mobile electronic device; and
processing the image data to perform facial recognition with respect to the user and the owner of the mobile electronic device.

5. The method of claim 1, wherein the sensor data comprises location data, and the method further comprises:
determining, based on the location data and the information maintained by the social-networking system that the user of the mobile device is in an atypical location for the user of the mobile device.

6. The method of claim 1, wherein the information maintained by the social networking system comprises social connection data indicating that the user of the mobile device is with one or more users with which the user has a social connection.

7. The method of claim 1, wherein the information maintained by the social networking system comprises calendar data and the mobile electronic device is transitioned to the second operation state based on the sensor data and the calendar data maintained by the social-networking system.

8. The method of claim 1, wherein the information maintained by the social-networking system comprises a status update associated with the user, and the method further comprises:
determining that the user is at a specific location based on the sensor data and the status update associated with the user.

9. The method of claim 1, wherein:
while in the first operation state, a screen of the mobile electronic device is turned on and an input component of the mobile electronic device is unlocked; and
while in the second operation state, the screen of the mobile electronic device is turned off and the input component of the mobile electronic device is locked.

10. The method of claim 9, wherein the sensor data is selected from the group consisting of:
touch-sensor data indicating that the user is not touching the mobile electronic device with a hand;
speed-sensor data indicating a decrease in speed of a movement of the mobile electronic device; and
light-sensor data indicating a decrease in ambient light around the mobile electronic device.

11. The method of claim 1, wherein:
while in the first operation state, a screen of the mobile electronic device is turned off and an input component of the mobile electronic device is locked; and
while in the second operation state, the screen of the mobile electronic device is turned on and the input component of the mobile electronic device is unlocked.

12. The method of claim 11, wherein the sensor data is selected from the group consisting of:
- touch-sensor data indicating that the user is performing an action selected from the group consisting of touching the mobile electronic device with a hand, grasping the mobile electronic device with the hand, and touching the mobile electronic device with one or more fingers;
- speed-sensor data indicating an increase in speed of a movement of the mobile electronic device; and
- light-sensor data indicating an increase in ambient light around the mobile electronic device.

13. The method of claim 11, wherein the mobile electronic device is transitioned to the unlocked state based on the characteristic information identifying the user of the mobile electronic device as being the member of the social-networking system.

14. The method of claim 13, wherein the characteristic information associated with the member of the social-networking system comprises location information and the mobile electronic device is transitioned into the unlocked state in response to determining that the mobile electronic device is in an atypical location.

15. A system comprising:
- a memory comprising instructions executable by one or more processors; and
- the one or more processors coupled to the memory and operable to execute the instructions, the one or more processors being operable when executing the instructions to:
  - receive sensor data, while a mobile electronic device is in a first operation state, from one or more sensors of the mobile electronic device;
  - obtain characteristic information maintained by the social-networking system and stored at the mobile electronic device, the social-networking system being remote from the mobile electronic device;
  - compare the sensor data to the characteristic information maintained by a social-networking system to estimate a current intention of a user with respect to the mobile electronic device, the characteristic information being associated with the user as a member of the social-networking system; and
  - based on the comparison of the sensor data to the characteristic information maintained by the social-networking system, transition from the first operation state to a second operation state based on the current intention of the user with respect to the mobile electronic device as determined based on the sensor data and the information maintained by the social-networking system.

16. The system of claim 15, wherein:
- while in the first operation state, a screen of the mobile electronic device is turned off and the mobile electronic device is security locked;
- while in the second operation state, the screen of the mobile electronic device is turned on and the mobile electronic device is security unlocked; and
- the sensor data comprise imaging data indicating that the user is likely an owner of the mobile electronic device.

17. The system of claim 15, wherein the sensor data comprises location data, and the one or more processors being further operable when executed to:
- determine, based on the location data and the information maintained by the social-networking system that the user of the mobile device is in an atypical location for the user of the mobile device.

18. The system of claim 15, wherein the information maintained by the social networking system comprises social connection data indicating that the user of the mobile device is with one or more users with which the user has a social connection.

19. The system of claim 15, wherein the information maintained by the social networking system comprises calendar data and the mobile electronic device is transitioned to the second operation state based on the sensor data and the calendar data maintained by the social-networking system.

20. The system of claim 15, wherein the information maintained by the social-networking system comprises a status update associated with the user, and the one or more processors being further operable when executed to:
- determine that the user is at a specific location based on the sensor data and the status update associated with the user.

21. The system of claim 15, wherein:
- while in the first operation state, a screen of the mobile electronic device is turned on, an input component of the mobile electronic device is unlocked, and the one or more sensors are all turned on; and
- while in the second operation state, the screen of the mobile electronic device is turned on, the input component of the mobile electronic device is unlocked, and at least one of the one or more sensors is turned off.

22. The system of claim 15, wherein the sensor data comprises imaging data, and the one or more processors are further operable when executed to:
- determine, based on the imaging data and the information maintained by the social-networking system that the user is likely an owner of the mobile electronic device; and
- process the image data to perform facial recognition with respect to the user and the owner of the mobile electronic device.

23. The system of claim 15, wherein:
- while in the first operation state, a screen of the mobile electronic device is turned on and an input component of the mobile electronic device is unlocked;
- while in the second operation state, the screen of the mobile electronic device is turned off and the input component of the mobile electronic device is locked; and
- the sensor data comprise touch-sensor data indicating that the user is not touching the mobile electronic device with a hand.

24. The system of claim 23, wherein the sensor data is selected from the group consisting of:
- touch-sensor data indicating that the user is not touching the mobile electronic device with a hand;
- speed-sensor data indicating a decrease in speed of a movement of the mobile electronic device; and
- light-sensor data indicating a decrease in ambient light around the mobile electronic device.

25. The system of claim 15, wherein:
- while in the first operation state, a screen of the mobile electronic device is turned off and an input component of the mobile electronic device is locked;
- while in the second operation state, the screen of the mobile electronic device is turned on and the input component of the mobile electronic device is unlocked; and
- the sensor data comprise touch-sensor data indicating that the user is touching the mobile electronic device with a hand.

26. The system of claim 25, wherein the sensor data is selected from the group consisting of:
- touch-sensor data indicating that the user is performing an action selected from the group consisting of touching the mobile electronic device with a hand, grasping the mobile electronic device with the hand, and touching the mobile electronic device with one or more fingers;
- speed-sensor data indicating an increase in speed of a movement of the mobile electronic device; and
- light-sensor data indicating an increase in ambient light around the mobile electronic device.

27. The system of claim 25, wherein the mobile electronic device is transitioned to the unlocked state based on the characteristic information identifying the user of the mobile electronic device as being the member of the social-networking system.

28. The system of claim 27, wherein the characteristic information associated with the member of the social-networking system comprises location information and the mobile electronic device is transitioned into the unlocked state in response to determining that the mobile electronic device is in an atypical location.

29. One or more computer-readable non-transitory storage media embodying software operable when executed by a mobile electronic device to:
- receive sensor data, while the mobile electronic device is in a first operation state, from one or more sensors of the mobile electronic device;
- obtain characteristic information maintained by a social-networking system and stored on the mobile electronic device, the social-networking system being remote from the mobile electronic device;
- compare the sensor data to the characteristic information maintained by a social-networking system to estimate a current intention of a user with respect to the mobile electronic device, the characteristic information being associated with the user as a member of the social-networking system; and
- based on the comparison of the sensor data to the characteristic information maintained by the social-networking system, transition from the first operation state to a second operation state based on the current intention of the user with respect to the mobile electronic device as determined based on the sensor data and the information maintained by the social-networking system.

30. The computer-readable non-transitory storage media of claim 29, wherein the sensor data comprises location data, and the software is further operable when executed by the mobile electronic device to:
- determine, based on the location data and the information maintained by the social-networking system that the user of the mobile device is in an atypical location for the user of the mobile device.

31. The computer-readable non-transitory storage media of claim 29, wherein the information maintained by the social networking system comprises social connection data indicating that the user of the mobile device is with one or more users with which the user has a social connection.

32. The computer-readable non-transitory storage media of claim 29, wherein the information maintained by the social networking system comprises calendar data and the mobile electronic device is transitioned to the second operation state based on the sensor data and the calendar data maintained by the social-networking system.

33. The computer-readable non-transitory storage media of claim 29, wherein the information maintained by the social-networking system comprises a status update associated with the user, and the software is further operable when executed by the mobile electronic device to:
- determine that the user is at a specific location based on the sensor data and the status update associated with the user.

34. The computer-readable non-transitory storage media of claim 29, wherein:
- while in the first operation state, a screen of the mobile electronic device is turned on, an input component of the mobile electronic device is unlocked, and the one or more sensors are all turned on; and
- while in the second operation state, the screen of the mobile electronic device is turned on, the input component of the mobile electronic device is unlocked, and at least one of the one or more sensors is turned off.

35. The computer-readable non-transitory storage media of claim 29, wherein:
- while in the first operation state, a screen of the mobile electronic device is turned off and the mobile electronic device is security locked, further comprising analyzing the sensor data and information maintained by the social-networking system to estimate the current intention of the user by comparing the sensor data to characteristic information stored in a profile associated with the user by the social-networking system; and
- while in the second operation state, the screen of the mobile electronic device is turned on and the mobile electronic device is security unlocked without requiring user input of a password.

36. The computer-readable non-transitory storage media of claim 26, wherein the sensor data comprises imaging data, and the software is further operable when executed by the mobile electronic device to:
- determine, based on the imaging data and the information maintained by the social-networking system that the user is likely an owner of the mobile electronic device; and
- process the image data to perform facial recognition with respect to the user and the owner of the mobile electronic device.

37. The computer-readable non-transitory storage media of claim 29, wherein:
- while in the first operation state, a screen of the mobile electronic device is turned on and an input component of the mobile electronic device is unlocked; and
- while in the second operation state, the screen of the mobile electronic device is turned off and the input component of the mobile electronic device is locked.

38. The computer-readable non-transitory storage media of claim 37, wherein the sensor data is selected from the group consisting of:
- touch-sensor data indicating that the user is not touching the mobile electronic device with a hand;
- speed-sensor data indicating a decrease in speed of a movement of the mobile electronic device; and
- light-sensor data indicating a decrease in ambient light around the mobile electronic device.

39. The computer-readable non-transitory storage media of claim 29, wherein:
- while in the first operation state, a screen of the mobile electronic device is turned off and an input component of the mobile electronic device is locked; and
- while in the second operation state, the screen of the mobile electronic device is turned on and the input component of the mobile electronic device is unlocked.

40. The computer-readable non-transitory storage media of claim 39, wherein the sensor data is selected from the group consisting of:
- touch-sensor data indicating that the user is performing an action selected from the group consisting of touching the mobile electronic device with a hand, grasping the mobile electronic device with the hand, and touching the mobile electronic device with one or more fingers;
- speed-sensor data indicating an increase in speed of a movement of the mobile electronic device; and
- light-sensor data indicating an increase in ambient light around the mobile electronic device.

41. The computer-readable non-transitory storage media of claim 39, wherein the mobile electronic device is transitioned to the unlocked state based on the characteristic information identifying the user of the mobile electronic device as being the member of the social-networking system.

42. The computer-readable non-transitory storage media of claim 41, wherein the characteristic information associated with the member of the social-networking system comprises location information and the mobile electronic device is transitioned into the unlocked state in response to determining that the mobile electronic device is in an atypical location.

* * * * *